United States Patent [19]
Pompa, Jr. et al.

[11] 3,805,141
[45] Apr. 16, 1974

[54] BIMODAL INVERTER
[75] Inventors: Thomas N. Pompa, Jr., Windsor, Conn.; Robert J. Resch, Chardon, Ohio
[73] Assignee: United Aircraft Corporation, East Hartford, Conn.
[22] Filed: Jan. 8, 1973
[21] Appl. No.: 322,052

[52] U.S. Cl. .............................. 321/11, 321/45 C
[51] Int. Cl. ........................................... H02m 1/18
[58] Field of Search ........................... 321/11, 45 C

[56] References Cited
UNITED STATES PATENTS
3,718,853   2/1973   Graf ................................. 321/45 C
3,641,421   2/1972   Graf et al. ....................... 321/45 C
3,119,058   1/1964   Genuit ............................. 321/45 C
3,406,326   10/1968  Stemmler ........................... 321/43

Primary Examiner—William M. Shoop, Jr.
Attorney, Agent, or Firm—Donald F. Bradley

[57] ABSTRACT

In an auxiliary impulse commutated inverter, the interval between the initiation of the commutation current and the turning on of a nonconducting main controlled rectifier is dependent upon an applied load. In response to a rapid increase of the load, the time interval is decreased, thereby increasing the energy stored by a commutating capacitor.

2 Claims, 4 Drawing Figures 3,805,141

BIMODAL INVERTER

BACKGROUND OF THE INVENTION

1. Field of the Invention This invention relates to inverter circuits and more particularly to the commutation of the main controlled rectifiers of an inverter circuit.

2. Description of the Prior Art Auxiliary impulse commutated inverter circuits are commonly used for providing AC power to a load in response to the application of a DC voltage from a fuel cell or any other suitable source. Most inverter circuits are comprised of a pair of main controlled rectifiers connected betwen the DC source and the load; alternately turning on and turning off of the main controlled rectifiers provide AC power to the load. In the auxiliary impulse commutated inverter, a current pulse is initiated by a commutation switch, such as an auxiliary controlled rectifier, to reverse the voltage on the conducting main controlled rectifier thereby turning it off. The pulse must be of a duration greater or equal to the turn-off time of the conducting main controlled rectifier. Usually, the pulse is formed by means of an oscillatory inductance-capacitance (L-C) network in which the natural period is directly related to the turn-off time of the main controlled rectifiers and the characteristic impedance is related to the voltage provided by the DC voltage source and the maximum value of the load current provided by the inverter.

It is well known in the art that for efficient operation of an inverter the ideal time between initiating the pulse and the turning on of the nonconducting main controlled rectifier is one-half the natural period of the L-C network. However, these inverters tend to be inoperative when the load is rapidly increased. Accordingly, the nonconducting main controlled rectifier is usually turned on prior to the ideal time thereby providing less efficient inverters which are operative when the load is rapidly increased.

Heretofore, simple reliable and efficient apparatus for the operation of inverters under all conditions of load changes has been unknown in the prior art.

SUMMARY OF THE INVENTION

An object of the present invention is to provide inverters.

Another object of the present invention is to provide efficiently operated inverters where a load applied thereto may be rapidly increased.

According to the present invention, in an auxiliary impulse commutated inverter, apparatus responsive to a rapid increase of an applied load causes a decrease of the time interval between the initiation of a commutation current and the turning on of a nonconducting main controlled rectifier.

An inverter in accordance with the present invention is highly efficient because it is bimodal; the inverter operates in a high-efficiency mode when the applied load is not rapidly increased and operates in a low-efficiency mode for a short duration of time after a rapid increase in load has occurred.

Other objects, features and advantages of the present invention will become more apparent in the light of the following detailed description 0f a preferred embodiment thereof as illustrated in the accompanying drawings.

DESCRIPTION OF THE PREFERRED EMBODIMENT

In the present invention, an inverter is operated bimodally. When the applied load is constant, decreasing or slowly increasing, the inverter is operated in a high-efficiency mode. When the load is rapidly increased, the inverter is operated for a short duration in a low-efficiency mode which assures the continued operation of the inverter.

Figure 1:
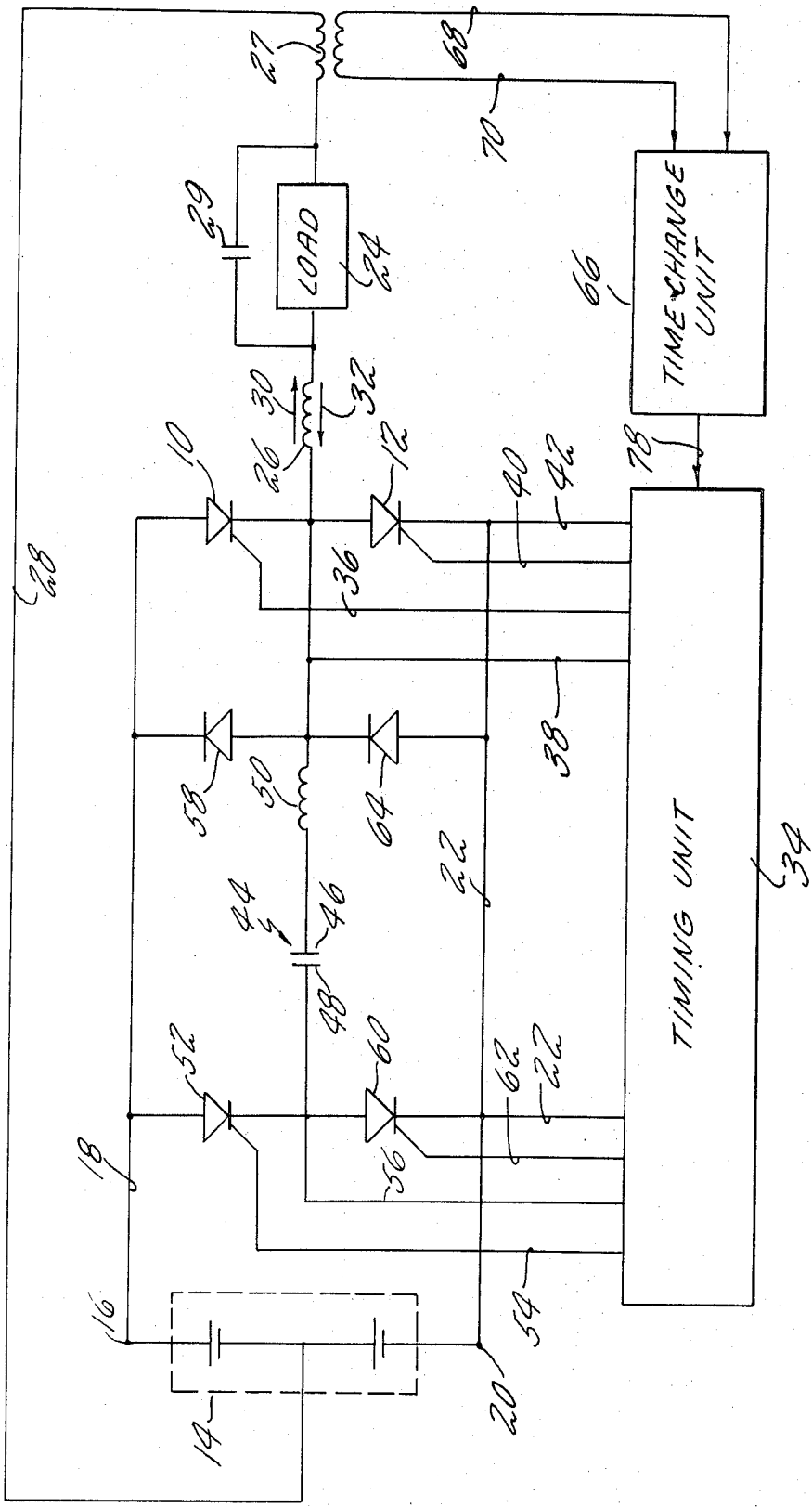
FIG. 1 is a schematic block diagram of the preferred embodiment of the present invention.

Referring now to FIG. 1, an auxiliary impulse commutated inverter is comprised of a pair of main controlled rectifiers 10, 12, the cathode of the main controlled rectifier 10 being connected to the anode of the main controlled rectifier 12. A center tapped DC power source 14 has a positive terminal 16 connected to the anode of the main controlled rectifier 10 through a DC power line 18. A negative terminal 20 of the source 14 is connected to the cathode of the main controlled rectifier 12 through a DC power return line A load Aload 24, a filter inductor 26, and a current sensing transformer 27 are connected in series from the junction of the cathode and anode of the main controlled rectifiers 10, 12 respectively, to the center tap of the source 14 through a neutral line 28. A filter capacitor 29 is connected across the load 24. In the operation of the inverter, the main controlled rectifiers 10, 12 are alternately turned on and turned off thereby causing respective currents through the load 24 in the directions indicated by arrows 30, 32. The main controlled rectifiers 10, 12 are simultaneously nonconductive during a short commutation interval after a main controlled rectifier is turned off.

Gate to cathode voltage pulses (called gate pulses) are provided by a timing unit 34 to the main controlled rectifiers 10, 12 for turning them on at alternate times. The timing unit 34 is connected to the gate and cathode of the main controlled rectifier 10 through signal lines 36, 38 respectively, and to the gate and cathode of the main controlled rectifier 12 through signal lines 40, 42, respectively.

In order to explain the teachings of the present invention, assume that the main controlled rectifier 10 has been turned on in response to a gate pulse provided by the timing unit 34 on the lines 36, 38. Additionally, the main controlled rectifier 12 is nonconductive and a capacitor 44 has one side 46 positively charged with respect to the other side 48. The side 46 is connected through a commutation inductor 50 to the cathode and anode respectively of the main controlled rectifiers 10, 12. An auxiliary controlled rectifier 52 has its anode connected to the terminal 16 through the line 18 and its cathode connected to the side 48 of capacitor 44. The gate and the cathode of the auxiliary controlled rectifier 52 are connected to the timing unit 34 through signal lines 54, 56, respectively. The anode and cathode of a diode 58 are respectively connected to the cathode and anode of the main controlled rectifier 10. In response to a gate pulse (referred to as a commutating gate pulse) provided by the timing unit 34 on the lines 54, 56, the controlled rectifier 52 becomes conductive, thereby causing the transfer of the energy stored in the capacitor 44 (proportional to the square of the voltage across the capacitor 44) to the inductor 50 causing a commutation current to flow through the inductors 26, 50, the load 24, and the transformer 27 thereby reducing the load current flowing through the main controlled rectifier 10 to zero. The portion of the commutation current in excess of the load current flows through the diode 58 which causes a small positive voltage from the anode to the cathode thereof which turns off the main controlled rectifier 10. When the commutation current is substantially zero, the auxiliary controlled rectifier 52 is automatically extinguished. Therefore, the auxiliary controlled rectifier 52, in conjunction with the capacitor 44, the inductor 50 and the diode 58 commutates the controlled rectifier 10. Commutation capacitor 44 has now charged up in the reverse direction with positive voltage on side 48.

After the commutation current turns off the main controlled rectifier 10, a gate pulse provided by the timing unit 34 on the lines 40, 42 turns on the main controlled rectifier 12. The commutation of the main controlled rectifier 12 is similar to the commutation of the main controlled rectifier 10 described hereinbefore. An auxiliary controlled rectifier 60 has its cathode connected to the terminal 20 through the line 22 and its anode connected to the side 48 of capacitor 44. The gate and the cathode of the controlled rectifier 60 are connected to the timing unit 34 through a signal line 62 and the line 22 respectively. The anode and the cathode of a diode 64 are respectively connected to the cathode and anode of the main controlled rectifier 12. In response to a commutating gate pulse provided by the timing unit 34, the auxiliary controlled rectifier 60 becomes conductive, thereby causing a commutation current to flow through the inductors 50, 26, the load 24 and the transformer 27 and reducing the load current flowing through the main controlled rectifier 12 to zero. The portion of the commutation current is excess of the load current flows through the diode 64 which causes a small positive voltage from the anode to the cathode thereof which turns off the main controlled rectifier 12. When the commutation current is substantially zero, the auxiliary controlled rectifier 60 is automatically extinguished. Therefore, the auxiliary controlled rectifier 60, in conjunction with the capacitor 44, the inductor 50 and the diode 64, commutates the main controlled rectifier 12. After the commutation of the main controlled rectifier 12, the capacitor 44 again has a charge; the side 48 is negative with respect to the side 46, the capacitor 44 thereby being conditioned to commutate the main controlled rectifier 10.

As is well known to those skilled in the art, the inverter is most efficiently operated and is therefore in a high-efficiency mode when the time interval between a pair of gate pulses respectively provided to an auxiliary controlled rectifier and a nonconducting main controlled rectifier is given as:

$t_o = \pi \sqrt{LC}$

L is the inductance of the inductor 50
C is the capacitance of the capacitor 44; and
$t_o$ is one-half the natural period of a network comprised of the inductor 50 and the capacitor 44.

If the commutation circuits consisted only of an auxiliary controlled rectifier, a capacitor and an inductor, a commutation current would flow during the time interval, $t_o$, and then become zero. During the commutation interval, however, when both of the main controlled rectifiers are turned off, the load 24 and the inductor 26 increase the natural period of the circuit which conducts the commutation current. Therefore, because of the increase of the natural period, the commutation current is conducted by the controlled rectifiers 52, 60 for a time interval greater than $t_o$.

For reasons explained hereinafter, under all load conditions, except a rapidly increasing load, the inverter is operated in the high-efficiency mode. Ordinarily, when operating the inverter in the high-efficiency mode, the rate of an increase of the load 24 must be limited because the voltage across the capacitor 44 is boosted by an increment of the load current during a part of the commutation after the conducting main control rectifier has been turned off. Therefore, although the inverter may operate under a condition of maximum load, a rapid increase from no load to maximum load, for example, may cause a failure to commutate because of an insufficient charge on the capacitor 44 causing an insufficient commutation current immediately after the increase. In the present invention, a rapid increase of the load 24 causes a time interval, $t_c$, between a commutating gate pulse and a gate pulse provided to turn on a nonconducting main controlled rectifier. The time interval, $t_c$, is given as:

$t_c = 0.767 \pi \sqrt{LC}$. As is known to those skilled in the art, when the time interval between the gate pulses is less than the time interval, $t_o$, (such as the time interval, $t_c$) the capacitor 44 charges to a higher voltage (the increased charge on the capacitor 44 is proportional to the commutation current when the main controlled rectifier becomes conductive), thereby providing a higher commutating current when the capacitor 44 is discharged. It is well known in the art that although the efficiency of the inverter is lower when the time interval, $t_c$, is used, the inverter is of optimal efficiency under conditions where the load may rapidly increase.

In the present invention, rapid changes of the load 24, such as step changes, are, in part, isolated from the inverter by the inductor 26 because instantaneous changes of the load current cannot be sustained therethrough. A sense current, proportional to the load current, is provided by the secondary winding of the transformer 27 to the time change unit 66 through signal lines 68, 70. In response to a rapid, predetermined increase in the load 24, the time change unit 66 provides a pulse typically of 30 milliseconds duration for inverters which provide power at 60 Hz to a load. It should be understood that the intervals, $t_c$ and $t_o$, are much less than 30 milliseconds. The output of the time change unit 66 is connected to the timing unit 34 through a signal line 78. During the 30 millisecond pulse, the timing unit 34 respectively provides, with the time interval, $t_c$, therebetween, commutating gate pulses and pulses to turn on the main controlled rectifiers as described hereinafter.

Figure 2:
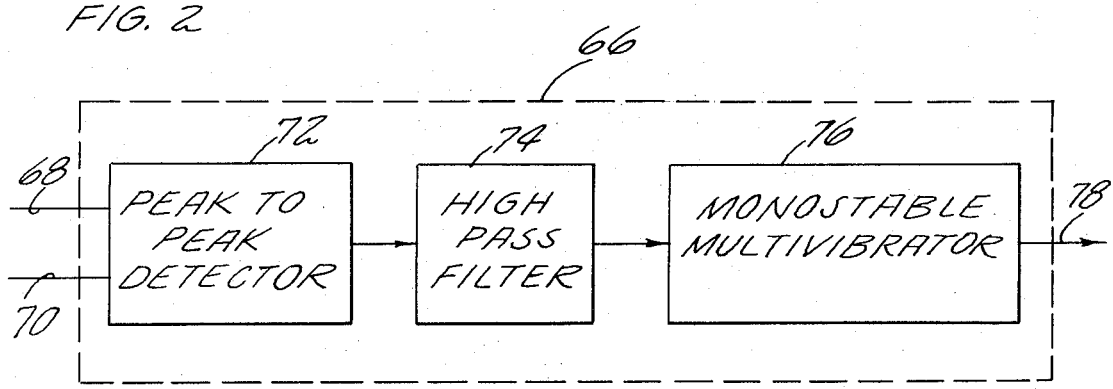
FIG. 2 is a schematic block diagram of the time change unit in the embodiment shown in FIG. 1.

Referring now to FIG. 2, the time change unit 66 is comprised of a peak-to-peak detector 72, a high pass filter 74 and a monostable multivibrator 76 all connected in series. In response to a rapid increase of the load 24, an increase of current is provided therethrough by the capacitor 29. The peak-to-peak detector 72 provides a voltage proportional to the current through the load 24. The output of the detector 72 drives the filter 74 which provides a trigger voltage in response to a rapid increase of the output of the detector 72. The trigger voltage provided by the high pass filter triggers the monostable multivibrator 76 which provides a 30 millisecond pulse in response thereto on a line 78.

Figure 4:
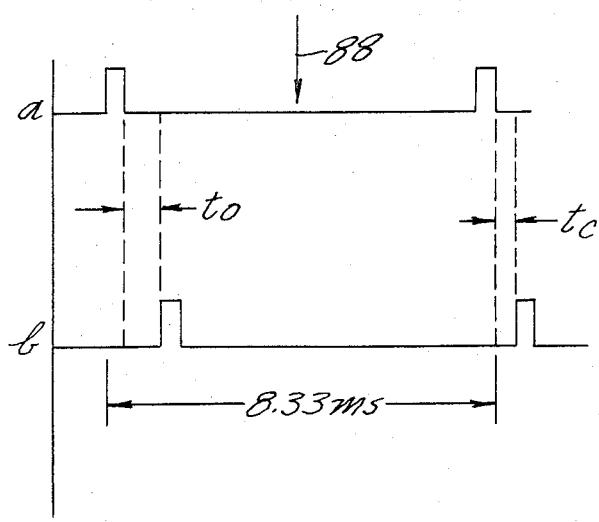
FIG. 4 is a timing diagram which shows the relationship of pulses provided by the timing unit shown in FIG. 3.
Figure 3:
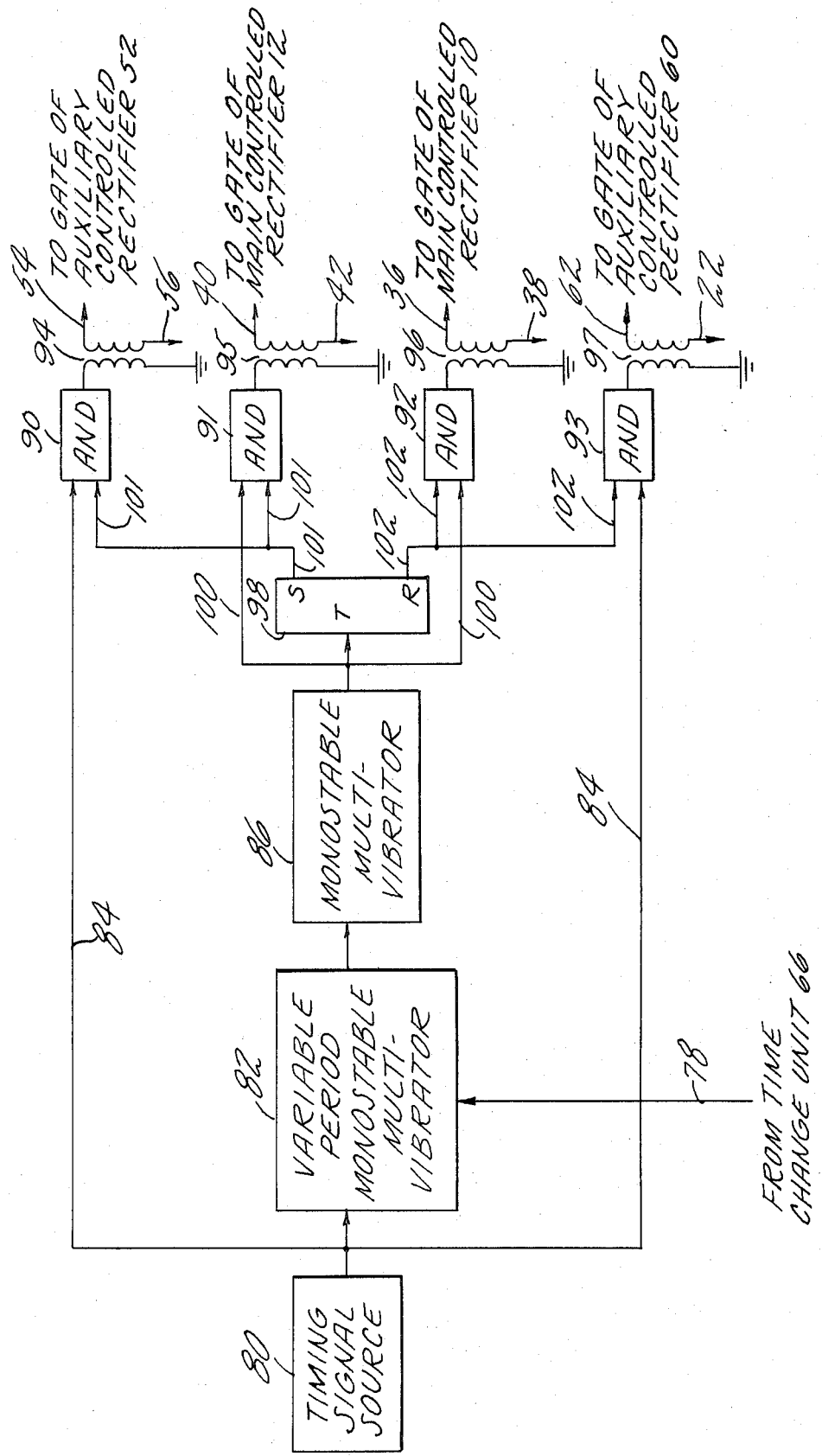
FIG. 3 is a schematic block diagram of the timing unit in the embodiment shown in FIG. 1.

Referring now to FIGS. 1, 3 and 4, the timing unit 34 is comprised of a timing signal source 80 which provides narrow, positive voltage pulses at a 120 Hz rate. The successive pulses correspond to 0, $\pi$, 2 $\pi$, 3 $\pi$ ... radians during cycles of the 60 Hz excitation provided to the load 24. Illustration a, FIG. 4 shows two representative pulses provided by the source 80. The output of the source 80 is connected to a first input of a variable period monostable multivibrator 82 through a signal line 84. A second input of the variable multivibrator 82 is connected to the output of the time change unit 66 through the line 78. In the absence of the 30 millisecond pulse being provided on line 78, the variable multivibrator 82 provides a voltage pulse (called a timing control pulse) having a pulse width equal to the time interval, $t_o$. A 30 millisecond pulse provided on the line 78 causes the variable multivibrator 82 to provide a timing control pulse having a duration equal to the time interval, $t_c$. The trailing edge of the timing control pulse triggers a fixed period monostable multivibrator 86 which provides in response thereto a pulse (called a delayed pulse) of substantially the same amplitude and duration as a pulse provided by the source 80. Therefore, in the absence of a rapid increase of the load 24, for each pulse provided by the source 80, delayed therefrom by the time interval, $t_o$, a delayed pulse is provided. In response to a rapid increase of the load 24, for each pulse provided by the source 80 (during 30 milliseconds after the rapid increase) delayed therefrom by the time interval, $t_c$, a delayed pulse is provided. Illustration $b$, FIG. 4 shows the delayed pulses on a common time base with the pulses provided by the source 80 (Illustration a, FIG. 4). It should be noted that an exemplary step increase in the load 24 occurs at a time indicated by an arrow 88, thereby causing a time interval, $t_c$, between the successive pulse provided by the source 80 and the successive delayed pulse.

To provide gate pulses to the controlled rectifiers, the output of AND gates 90–93, are respectively connected to the primary windings of transformers 94–97. The secondary windings of the transformers 94–97 are each respectively connected to the gate and the cathode of the controlled rectifiers 52, 12, 60, 10 through pairs of the lines 54, 56; 40, 42; 62, 22 and 36, 38. As explained hereinafter, gate pulses are transmitted by the AND gates 90–93 to the controlled rectifiers 10, 12, 52, 60.

A flip-flop 98 has its trigger input connected to the output of the multivibrator 86 through a signal line 100. The flip-flop 98 alternatively provides (at S and R) a positive voltage level and ground on a pair of signal lines 101, 102. Each alternation is in response to the trailing edge of a delayed pulse.

The AND gates 90, 91 have first inputs connected to the S output of the flip-flop 98 through the lines 101. The AND gates 92, 93 have first inputs connected to the R output of the flip-flop 98 through the lines 102. The second input of the AND gates 90, 93 are connected to the source 80 through the lines 84 and the second input of the AND gates 91, 92 are connected to the output of the multivibrator 86 through the lines 100. In response to the positive voltage level being provided on the lines 100, a pulse provided by the source 80 is transmitted by the AND gate 90 as a commutating gate pulse to the controlled rectifier 52; a delayed pulse is thereafter transmitted as a gate pulse by the AND gate 91 to turn on the main controlled rectifier 12. The trailing edge of the delayed pulse triggers the flip-flop 98 thereby causing a provision of the positive voltage level on the lines 102 and ground on the lines 101 as described hereinbefore. The next pulse provided by the source 80 is transmitted by the AND gate 93 as a commutating gate pulse to the auxiliary controlled rectifier 60; a delayed pulse is thereafter transmitted as a gate pulse by the AND gate 92 to turn on the main controlled rectifier 10. The trailing edge of the delayed pulse triggers the flip-flop 98 thereby causing the provision of the positive voltage and ground respectively on the lines 101, 102 whereby the AND gates 90, 91 are conditioned to provide, respectively, gate pulses to the auxiliary controlled rectifier 52 and the main controlled rectifier 12.

Although the invention has been shown and described with respect to a preferred embodiment thereof, it should be understood by those skilled in the art that the foregoing and various other changes and omissions thereof in the form and detail thereof may be made therein without departing from the spirit and scope of the invention.

We claim:

1. In an impulse commutated inverter circuit of the type where load current is alternately provided through a pair of main controlled rectifiers to an applied load, a commutation switch is turned on to cause the transfer of the energy stored by a commutation capacitor to a commutation inductor which provides a commutation current to turn off the conducting main controlled rectifier, the time between the turning on of the commutation switch and the turning on of the nonconducting main controlled rectifier being a selected time interval, the improvement comprising:

sensing means for sensing the current flow through said load and producing a sense signal in response thereto;

means responsive to a rapid increase in said sense signal above a predetermined magnitude for generating a control signal;

and means responsive to said control signal for decreasing said selected time interval to a reduced time interval.

2. Apparatus according to claim 1 wherein said selected time interval is given as $t_o = \pi$ LC where C is the capacitance of the commutation capacitor, L is the inductance of the commutation inductor, and $t_o$ is the selected time interval; and said selected time interval is decreased to a reduced time interval given as $t_c = 0.767 \pi$ LC where $t_c$ is the decreased selected time interval.

* * * * *

PO-1050
(5/69)

UNITED STATES PATENT OFFICE
CERTIFICATE OF CORRECTION

Patent No. 3,805,141          Dated April 16, 1974

Inventor(s) Thomas N. Pompa, Jr. and Robert J. Resch

It is certified that error appears in the above-identified patent and that said Letters Patent are hereby corrected as shown below:

Column 2, line 31, after "line" insert --22.--

Column 2, line 31, cancel the "A"

Column 2, line 32, cancel the first "load"

Column 3, line 45, change "is" to --in--

Column 3, line 65, the equation should read $--t_o = \pi\sqrt{LC}--$

Column 4, line 34, the equation should read $--t_c = \pi\sqrt{LC}--$

Column 6, claim 2, line 57, the equation should read
     $--t_o = \pi\sqrt{LC}--$ Column 6, claim 2, line 65, the equation should read
     $--t_c = 0.767\,\pi\sqrt{LC}--$ Signed and sealed this 1st day of October 1974.

(SEAL)
Attest:

McCOY M. GIBSON JR.          C. MARSHALL DANN
Attesting Officer               Commissioner of Paten